(12) United States Patent
Brown

(10) Patent No.: US 10,185,968 B2
(45) Date of Patent: Jan. 22, 2019

(54) MI2CENT LIVE VIDEO STREAMING PPV STRIKER VS. PUNCHER COMBAT SPORTS BETTING APP METHODOLOGY PLATFORM

(71) Applicant: Vincent Brown, Las Vegas, NV (US)

(72) Inventor: Vincent Brown, Las Vegas, NV (US)

(*) Notice: Subject to any disclaimer, the term of this patent is extended or adjusted under 35 U.S.C. 154(b) by 433 days.

(21) Appl. No.: 15/220,154

(22) Filed: Jul. 26, 2016

(65) Prior Publication Data
US 2016/0350795 A1  Dec. 1, 2016

Related U.S. Application Data

(63) Continuation-in-part of application No. 14/789,541, filed on Jul. 1, 2015.

(60) Provisional application No. 62/019,673, filed on Jul. 1, 2014.

(51) Int. Cl.
*G06F 17/00* (2006.01)
*G06Q 30/02* (2012.01)
*G06Q 50/00* (2012.01)

(52) U.S. Cl.
CPC ......... *G06Q 30/0239* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 2007/0054728 A1* | 3/2007 | Hood | ...................... | G07F 17/32 463/16 |
| 2007/0102877 A1* | 5/2007 | Personius | ............... | G07F 17/32 273/138.2 |
| 2009/0291733 A1* | 11/2009 | Chim | .................. | G07F 17/3258 463/17 |
| 2011/0014964 A1* | 1/2011 | Crowder, Jr. | ........... | G07F 17/32 463/13 |
| 2013/0157752 A1* | 6/2013 | Yoseloff | .............. | G07F 17/3244 463/25 |

* cited by examiner

*Primary Examiner* — Paul A D'Agostino
(74) *Attorney, Agent, or Firm* — Cardinal Law Group

(57) ABSTRACT

A wagering method and a system operating on at least one central server enabling betting among Mi2Cents (M2C) Subscribers, the system comprising: at least one computing system; at least one data processor; a platform; a wager at the at least one central server, a first member using a first user interface device in communication with the at least one central server; a means for receiving at the at least one central server at least one response to the wager by at least one of a plurality of M2C Subscribers; a means for publishing the at least one response at the least one central server; a percentage payment using M2C Methodology; and a means for crediting an account of the first member with a percentage payment that is integrated into M2C Live Fight Promotion Events individual combat fight round purse split amounts between two combat fighters; wherein the percentage payment is based on M2C Subscriber's bet on a winner of any given fight round before and after the round has ended; wherein the computer comprises a tangible, non-transitory computer readable media comprising machine-readable executable code operable on the at least one central server.

20 Claims, 4 Drawing Sheets

MI2CENT LIVE VIDEO STREAMING PPV STRIKER VS. PUNCHER COMBAT SPORTS BETTING APP METHODOLOGY PLATFORM

FIELD OF THE INVENTION

The present invention is in the technical field of social media. More specifically the Mi2Cents (M2C) Social Media Platform (M2CSMP) is a World Wide Web Platform business model application that is custom made coded software, permitting several alternatives to preface the tentative stating of one's opinion or wager on-line through computers, mobile and wireless devices. An embodiment is a wagering method and a system operating on at least one central server enabling betting among M2C Subscribers.

BACKGROUND OF THE INVENTION

Currently, there are many on-line social media forum sites that are limited. First, there is no monetary reward value system available for on-line M2C Subscribers who wish to freely provide their opinions on various topics of information through postings on-line. Any on-line user can give away valuable free personal and non-personal information through postings that others can see and share for free without ever once getting rewarded from doing so. Second, today's social media sites represent an "invitation" to converse without the users really being able to earn a personal financial reward they can use for posting what they want to share.

The M2CSMP encourages the behavior of its users to give their opinions through its "Incentive Rewards Program". Most social media sites are mostly a one-way street where users post various comments, photos, videos, and up-dates etc. without ever truly being encouraged to have an open honest dialog of getting other opinions based on what they really think. Third, there's no actual reward system in place for mobile wireless smart phone users who down load mobile apps and website links onto their mobile wireless device that will connect them directly to an advertisers websites.

Global sales of smartphones to end users totaled 349 million units in the first quarter of 2016. M2CSMP is an attractive new business model platform strategy that offers any smartphone user a way to rack up virtual dollars that can be exchanged into real dollar value items.

SUMMARY OF THE INVENTION

Embodiments of the present invention relate to a Mi2Cents (M2C) Social Media Platform (M2CSMP) for understanding various topics of information based on millions of opinions that may be rewarded for each opinion provided. It will be used to take the temperature of people across the world by giving them an opportunity to provide their opinions on any topic they choose such as Personal Feelings, Family, Stocks, Elections, Breaking News, Consumer Product Surveys, Religious Opinions and the like.

Embodiments relate to a system comprising at least one central server, wherein the at least one server device includes processors, memory, databases including a non-transitory computer readable recoding medium and having stored there on computer-executable instructions that, in response to execution, execute a method adapted to enable communication between social media participants in exchange for economic benefits.

An embodiment is a wagering system operating on at least one central server enabling betting among M2C Subscribers/Subscribers (M2C Subscribers), the system comprising:
  at least one computing system;
  at least one data processor;
  a wager at the at least one central server;
  a first member using a first user interface device in communication with the at least one central server;
  a means for receiving at the at least one central server at least one response to the wager by at least one of a plurality of M2C Subscribers;
  a means for publishing the at least one response at the least one central server;
  a percentage payment using M2C Methodology; and
  a means for crediting an account of the first member with a percentage payment; wherein
  the percentage payment is based on live M2C Subscribers' bet on a winner of any given fight round before and after the round has ended;
  wherein the computing system comprises a tangible, non-transitory computer readable media comprising machine-readable executable code operable on the at least one central server.

In one embodiment, the platform is a platform selected from the group consisting of: M2C Live video streaming Striker vs Puncher Combat Sports Betting website application platform, M2C Incentive Rewards Program Platform, M2C Social Media Platform, M2C Business Model Platform, M2C On-Line Social Media Platform, M2C Platform, Business Model Platform, and Premium Advertising Platform.

Another embodiment is a wagering method comprising providing a system operating on at least one central server enabling betting among M2C Subscribers, the system comprising:
  at least one computing system;
  at least one data processor;
  a platform;
  a wager at the at least one central server;
  a first member using a first M2C Subscriber interface device in communication with the at least one central server;
  a means for receiving at the at least one central server at least one response to the wager by at least one of a plurality of M2C Subscribers;
  a means for publishing the at least one response at the least one central server;
  a percentage payment using M2C Methodology; and
  a means for crediting an account of the first member with a percentage payment;
wherein the percentage payment is based on an M2C Subscriber's bet on a winner of any given fight round before and after the round has ended; wherein the computer comprises a tangible, non-transitory computer readable media comprising machine-readable executable code operable on the at least one central server.

In at least one embodiment, an original publication is created by an originating member using a first M2C Subscriber interface device for example communicating with at least the at least one central server. A first action of an M2C Subscriber making a opinion or the sort.

The original publication is published by the at least one central server. The original publication may be read by a plurality of M2C Subscribers using a plurality of user interface devices communicating with at least the at least one central server. At least one response to the published original publication is created by at least one of the plurality of M2C Subscribers using user interface devices for example.

The at least one response is published by the at least one central server. The at least one central server credits an account of the originating member on the server by a predetermined amount for each published response. The system enables the originating member to purchase at least one of a product and service offered through the at least one central server by a provider.

Another embodiment relates to a tangible, non-transitory computer readable media comprising machine-readable executable code operable on at least one central server. The machine-readable executable code causes the at least one central server to receive an original publication by an originating member using a first user interface device in communication with at least the at least one central server; and publish the original publication at the at least one central server.

At least one response is received at the at least one central server in response to the published original publication by at least one of a plurality of M2C Subscribers; the at least one response is published at the least one central server; and an account of the originating member is credited.

Another embodiment relates to a computer implemented method operating on the at least one central server enabling communication among social media participants in exchange for economic benefits. The computer implemented method includes creating an original publication by an originating member using a first user interface device communicating with at least the at least one central server; and publishing the original publication by the at least one central server.

The method further includes reading the published original publication by a plurality of M2C Subscribers using a plurality of user interface devices communicating with at least the at least one central server and creating at least one response to the published original publication by at least one of the plurality of M2C Subscribers.

The method includes publishing the at least one response by the at least one central server. The account of the originating member is credited a predetermined amount for each published response; enabling the originating member to purchase at least one of a product and service offered through the at least one central server.

Another embodiment relates to a computer implemented method operating on at least one central server enabling communication between social media participants in exchange for economic benefits, the computer implemented method including receiving at the at least one central server an original publication by an originating member using a first user interface device in communication with that at least the at least one central server; publishing the original publication at least one central server; receiving at the at least one central server at least one response to the published original publication by at least one of a plurality of M2C Subscribers; publishing the at least one response at the least one central server; crediting an account of the originating member based on the reception of the at least one response; and enabling the originating member at the central server to use account credits to initiate a purchase of at least third party offer.

The foregoing and other features and advantages of the invention will become further apparent from the following detailed description of the presently preferred embodiment, read in conjunction with the accompanying drawings. The drawings are not to scale. The detailed description and drawings are merely illustrative of the invention rather than limiting, the scope of the invention being defined by the appended claims and equivalents thereof.

BRIEF DESCRIPTION OF THE DRAWINGS

Throughout the various figures, like reference numbers refer to like elements.

DETAILED DESCRIPTION OF THE INVENTION

Figure 1:
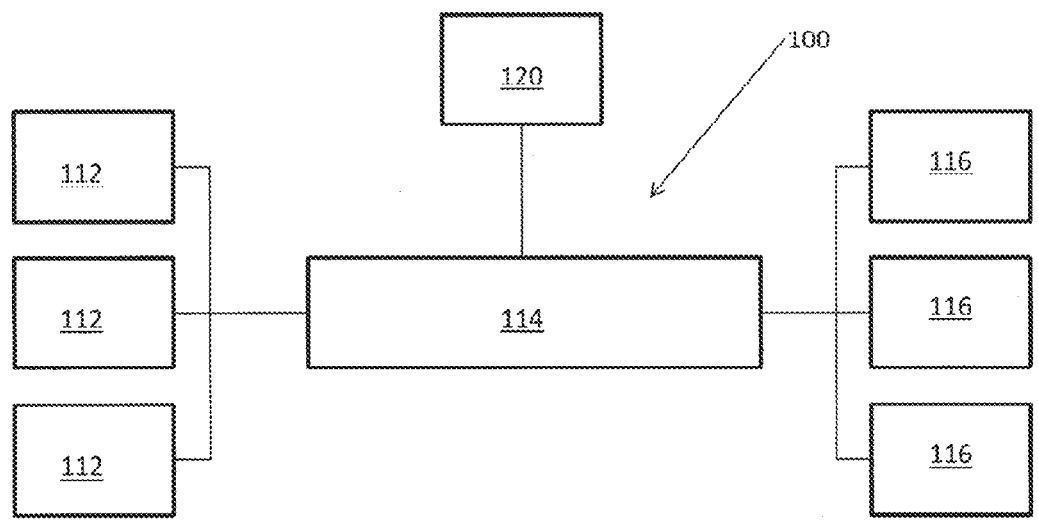
FIG. 1 illustrates a high level block diagram of a system in accordance with one embodiment of the present invention.

The term "Mi2Cents (M2C) Social Media Platform (M2CSMP)" is a World Wide Web application that is a custom made coded software permitting several alternatives to the presentation of one's opinion on-line through personal computers, mobile devices, wireless devices and other computing systems.

In one embodiment, the opinion is a wager using the M2CSMP, wherein the wager comprises one or more specific bets, whereby an M2C Subscriber makes at least one specific bet comprising a specific amount of money on at least one specific round before the round has begun, at least one specific bet comprising a specific amount of money on the at least one specific round during the round, and/or at least one other bet comprising a specific amount of money on the at least one specific round after the round has ended; wherein the wager is in an open scoring system.

The M2CSMP comprises a platform such as an M2C Platform, M2C Live Video Streaming Striker Vs Puncher Combat Sports Betting Website Application Platform (M2CSMP-1), M2C Incentive Rewards Program Platform (M2CIRPP), M2C Social Platform M2CSP), M2C Business Model Platform (M2CBMP), M2C On-Line Social Media Platform (M2COSMP), M2C Games Platform (M2CGP), or M2C Premium Advertising Platform (M2CPAP), wherein all of these platforms use the custom made coded proprietary software.

M2CPAP is a marketing exchange process for M2C Subscribers to see various advertiser rewards/coupons offered to them on their M2C Subscriber page that allows them to instantly connect to product and service discounts.

M2C Incentive Rewards Program Platform (M2CIRPP) is an M2CSMP, wherein the platform is a predetermined monetary value number system, wherein M2C Subscribers reach a predetermined award amount that triggers an electronic mechanism that activates flashing lights, words that can say Gold, Platinum, or Diamond that include the dollar amount won. The M2CIRPP comprises elements of total rewards that collectively define how M2CSMP benefits its M2C Subscribers through monetary compensations for participation.

M2CSMP-1 is an M2CSMP having live video streaming capability on the Internet, showing a live event, such as a sport event, wherein the event is a competition between two participants engaged in the event to win a prize, wherein the prize comprises a monitory reward.

In one embodiment, the event is a competition between two participants engaged in the event to win a prize, wherein the prize comprises a monitory reward.

A sport is any type of competition pitting one individual or a team against an opponent, who may be an individual or a team, respectively, wherein the sport includes, but not limited to, combat and non-combat sports.

Combat sports comprise, but not limited to, martial arts and non-martial arts, either involving weapons or no weapons.

Non-combat sports comprise, but not limited to, competitions outside the combat sports, such as board games, card games, ball games, water sports, races, Olympic sports, elections, and such other competitions.

Elections include elections for political or non-political offices; local, state, federal or judicial offices; public, private, profit or non-profit organization; organizational or non-organizational, etc.

Any event concerning the sport is a sporting event. Combat sports, or fighting sports, is a competitive sport with one-on-one combat that include Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, Sanshou, and the like.

The Board games include tabletop games that involves counters or pieces moved or placed on a pre-marked surface or "board" according to a set of rules such as Dice Games, Miniatures War games, Chess, Backgammon, Checkers, Go, Reversi, and the like. Card Games include any game using playing cards as the primary device with which the game is played, be they traditional or game specific such as poker, rummy, mahjong, Go Fish, Old Maid, War, Black Jack, Solitaire, Uno, or the like. Ball games include any game that is played with a ball such as a Baseball, Softball, Cricket, Racquetball, Tennis, Squash, Badminton, Handball, Basketball, Football, Lacrosse, Hockey, Volleyball, Golf, Billiards, Croquet and the like game's used in phrases like a whole new ball game and a different ball game to describe a situation or activity that has changed.

Water sports include swimming, water polo, waterskiing, surfing, diving, springboards, synchronized swimming, barefoot skiing, boat racing, canoeing, dragon boat racing, fishing, flyboard, flowboard, jet skiing, kayaking, kiteboating, parasailing, rafting, rowing, sailing, skurfing, and the like. Races include any form of racing such as Running, Walking, Skating, Skiing, Cycling, Motorsports, Animal racing, and the like. Olympic sports include competitions that leads to the award medals that includes a total of 46 Olympic events such as air sports, Billiards, Bowling, Bridge Chess, Cricket, Floorball, Karate, and the like.

Elections include a formal and organized process of electing or being elected, especially of members of a political body such as general election, by-election, primary election, recall election, local election, presidential election and the like.

M2C Striker vs Puncher Live Video Streaming/PAY PER VIEW/Bets Combat Sports Percentage Payment Betting App Methodology (M2C Methodology) comprises using the M2C Incentive Percentage Payout Structure (M2CIPPS) to pay each fighter based on the fighter's earnings or keep, wherein the winner of a given round, such as a fight round, match, innings, tournament, or the like, keeps the highest percentage payout split offered as the Percentage Round Purse Reward Amount (PRPRA).

Purse is the amount of money paid to the participants by a promoter of the sport. Promoter is a person or company that finances or organizes a sporting event, theatrical production, or any other event.

AN M2CSMP or M2C Subscriber (M2C Subscriber) is a person who signs up on the Internet site that lets them create a personal profile to access and log into the website or M2CSMP application and other platforms thereof for use.

A search window is a desktop search platform that has instant search capabilities for most common file types and data types, and third-party developers can extend these capabilities to new file types and data types.

An M2C Subscriber Profile Page can be accessed via the M2C account with login information that has a single "personal timeline" that can be used to manage multiple Pages, Apps, Ad accounts etc. in the M2CSMP. The M2C Subscriber profile page identifies subscribers online.

A Profile Picture is an M2C Subscriber's profile picture image that represents your page throughout M2C to your current or potential friends or followers.

A MiBrand is centered on M2C Subscribers bragging about their favorite Brand, Brands, Products, Services etc. on the M2C Internet Website.

A MiPhoto is an M2C Subscriber's photo used on the M2C Website.

A MiMeeting is link on M2C Subscriber's page that lets them conduct their own webinars on the Mi2CSMP.

A MiPhovid is a link on M2CSMP that, when engaged, links M2C Subscribers directly to a specific video within the Viddy app.

A MiNews is a window that provides a continuous non-stop streaming of other on-line M2C Subscribers postings.

A MiFriend is an M2C Subscriber's online friend.

A MiMail is an M2C Subscriber's online mail.

A MiBank is an M2C Subscriber's virtual or real online back account found on the M2C page.

A MiNotification is when M2C Subscriber's get notices on the Website.

A MiShare is designed for all M2C Subscriber's who want to offer money from their own virtual bank account to help other M2C Subscribers in a charitable way who don't have enough money in their own virtual bank accounts to qualify for the Free Gift Card/Coupon/Rewards.

AN M2CO is a "comment icon tab" where all posting of M2C-Opinions or the like are accomplished by clicking or engaging the icon symbol.

AN M2Chat is when M2C Subscriber's chat online with one another.

A Mipps is comprised of many apps used on M2CSMP.

A MiGames icon is comprised of various online games used via the M2CSMP.

A POP Device is Point of Presence which is the point at which two or more different networks or communication devices build a connection with each other.

An LTE is Long Term Evolution which applies more generally to the idea of improving wireless broadband speeds to meet increasing demand.

M2CSMP Pay Per View (PPV) or M2CSMP Internet Pay Per View (iPPV) is a service provided by M2CSMP to an M2C Subscriber of M2CSMP service to view a live event. Events can be purchased using an on-screen guide, an automated telephone system, or through a live customer service representative. M2CSMP Pay per view (PPV) or M2CSMP Internet Pay per view (iPPV) is used to distribute M2CSMP events.

The term "open scoring system" is defined as a system of scoring a round with a score, after every round, wherein score cards comprising the score are collected from judges by a referee and handed to an official, representative, or member of a governing body such as a state governing commission, a committee, election commission or the like, wherein the official displays the score on a screen at the venue and M2CSMP website available to M2C Subscribers. When the official inputs the score into a computer system, the score transfers electronically to the M2CSMP website and on a screen at the venue.

In an open scoring system, in one embodiment, the score transfers electronically to the M2CSMP website and on a screen at the venue will be displayed on the venue jumbotron screen. combat event round results of the winner and loser of the round that will display the percentage payout split distribution of money/reward of how much money the winner makes and loser makes.

A jumbotron, jumbovision, messageboard or scoreboard is a large screen or display, using a display device to show close up shots of an event, stream video, stream messages, wishes and opinions, and display scores. These displays can be used to publish M2C Opinion.

The display may replay a game action, names and pictures of the participants or players throughout the event. The Display features include an illuminated, non-illuminated, decorative, and custom signs and a sound system. An electronic visual display or screen is a display device for presentation of images, text, or video transmitted electronically, which may be recorded for future purposes as permanent record. Electronic visual displays include television sets, computer monitors, and digital signage. They are also ubiquitous in mobile computing applications like tablet computers, smartphones, and information appliances.

Displays may appear on auxiliary boards in addition to the main scoreboard during an event or a break. Messages can be 25, 50, 75, 100 or more characters long, in general. The display includes high-definition screens, videos, graphics and the like.

A display device is an output device for presentation of information in visual or tactile form. An electronic display is wherein the input is an electrical signal, the display is called electronic display.

AN M2C Opinion is a statement of one's opinion on-line through personal computers, mobile devices, wireless devices or other computing systems.

A wager is an M2C Opinion presented by an M2C Subscriber, wherein the wager comprises one or more bets on an event, recorded or live, wherein the wager is an agreement in which M2C subscribers try to guess what will happen and the person who guesses wrong is a loser, and the person who guesses right is a winner, the wager comprises money.

In one embodiment, the event is combat sport event.

Embodiments relate to system 100 as illustrated in FIG. 1 implementing a computer implemented method using user interfaces 112 and/or 116 for example. System 100 includes a plurality of user interface devices 112 and 116 communicating with at least one or more central servers 114. In at least one embodiment, the user interface devices 112 and 116 include cell phones, smart phones, tablets, laptops, notebook computers, personal digital assistants, work stations, desktop computers, land line or hard wired phones, personal computers, stand alone computers, tower computers, cash registers, POP devices, smart card terminals, biometric scanners, cars, planes, trains, and the like which allow wired or wireless communication. Further, the devices 112 and 116 communicate with the at least one or more central servers 114 via any intranet, wired network, wireless network (Wi-Fi), satellite network, cellular network (3G, 4G, LTE) and the like. The user may access a website via user devices 112 and/or 116 to download an application operating on the user interface devices 112/116.

FIG. 1 further illustrates the at least one or more central servers 114. The at least one server device 114 includes processors, memory, databases including a non-transitory computer readable recoding medium and having stored there on computer-executable instructions that, in response to execution, execute a method adapted to enable communication between social media participants in exchange for economic benefits.

In at least one embodiment, an original publication is created by an originating member using a first user interface device 112 for example communicating with at least the at least one central server 114. The original publication is published by the at least one central server 114.

The published original publication may be read by a plurality of M2C Subscribers using a plurality of user interface devices 112/116 communicating with at least the at least one central server 114.

At least one response to the published original publication is created by at least one of the plurality of M2C Subscribers using user interface devices 116 for example. The at least one response is published by the at least one central server 114. The at least one central server 114 credits an account of the originating member on the server by a predetermined amount for each published response. The system 100 enables the originating member to purchase at least one of a product and service offered through the at least one central server by a provider 120.

The following description is given as an example only and should not be seen in a limiting manner. M2C will provide a new state of the art website member sign up page and includes a web feature sub categories such as a Search Window, M2C Subscriber Profile Page, Profile Picture, Mibrand, Miphoto, Mimeeting, Miphovid, MiNews, MiFriends, MiMail, MiBank, MiNotification, Mishare, MiOpinion, MiO, Michat, Miapps, Migames icon's, and the like.

All posting of opinions are accomplished by clicking or engaging the icon symbol "MiO" which enables M2C Subscribers to enter their comments versus clicking a traditional "comment icon tab" symbol used on various other social media sites.

Friends or public respond to an originating members "M2C-Opinion" sent out for all on-line M2C Subscribers to see. Any response made using user interface devices 112 and/or 116 back to that originating members "Opinion" will automatically place 2¢ in the originating members Bank, Vault, or Penny Jar located on their front Profile Page or any other page.

Any M2C Subscriber who wants to write a response to the originating members "Opinion" will need to click on the icon button "MiO" user interface 112 and/or 116 which opens a window for them to write their own opinion in response to the original opinion made.

Every time an M2C Subscriber engages the "MiO" icon it opens up a window that says "Write an Opinion". The first letter the M2C Subscriber writes in their response opens the window to write a response, which includes a tab titled "MiPost". When the M2C Subscriber engages "MiPost" it immediately logs their response opinion which triggers a mechanism adding 2¢ to the last 2¢ in the originating M2C Subscriber's Bank, Vault, or Penny Jar, etc.

This window is where the "MiO" comments from other M2C Subscribers who've responded to an original opinion are found. These "MiO" comments include the M2C Subscribers profile name and response comment.

Another way M2C Subscribers add 2¢ to their M2C Subscriber bank vault includes M2C Subscribers clicking the Penny Icon Symbol tab using user interface 112 and/or 116 for example.

The Penny Icon Symbol has the same effect as a thumbs up sign, representing approval. Clicking on the Penny Icon Symbol tab activates a mechanism that triggers an automatic placing of 2¢ in that originating M2C Subscribers Bank, Vault or Penny Jar etc.

The system 100 provides numerous other windows with various specific features for the user interface devices 112 and/or 116. In one example M2C Subscribers news feed provides a continuous non-stop streaming of other on-line M2C Subscriber's postings that may be located under the "MiNews" icon symbol or other icon symbols. It may be located on the page of user interface devices 112 and/or 116 where all M2C Subscribers wanting to endorse the "MiO" can click on the Penny Icon Symbol that will be used like a thumbs up sign.

An M2CSMP will be displayed under the heading tabbed "MiNews" located on the user interface 112 and/or 116 for example that will be considered the heading for all M2C Subscribers wanting to endorse other M2C Subscriber's opinions.

Clicking on the "MiNews" tab will display a Penny Icon Symbol tab along with the "MiO" Icon tab and other possible tabs when opened.

Figure 4:
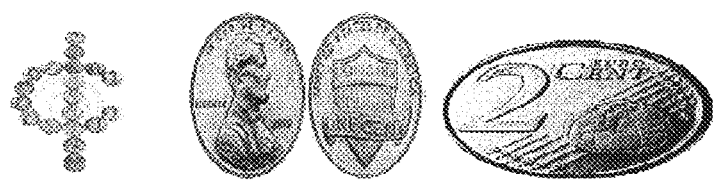
FIG. 4 illustrates examples of Penny Icon Symbols in accordance with one embodiment of the present invention.

Clicking on the Penny Icon Symbol and/or the MiO tab provides M2C Subscribers with only two of the ways M2C Subscribers can activate and trigger the automatic placement of 2¢ in an approve opinions made by other M2C Subscribers they're friends with, for example, 18¢ 3 MiO and symbols as shown in FIG. 4.

Figure 5:
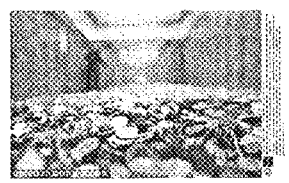
FIG. 5 illustrates an example of a Bank, Vault, or Penny Jar icon symbol in accordance with one embodiment of the present invention.

Each M2C Subscriber's front wall page includes a distinctive icon symbol such as a Bank, Vault, or Penny Jar as shown in FIG. 5. Inside each M2C Subscriber's bank vault is a non-stop visual tabulation mechanism that automatically calculates the adding of money from other M2C Subscribers "MiO" responses or engages of the Penny Icon Symbol, for example, FIG. 5.

The M2C Methodology is not limited to only using 2¢ in its activation methodology for placing coins or bills in M2C Subscribers virtual bank accounts based on M2C Subscribers MiO's. The M2C Platform may use any denomination value for COINS and BILLS as ways to implementing the activation method of placing money in an originating M2C Subscribers Bank, Vault or Penny Jar etc.

Different value denomination figure amounts that M2C may us include $1, 5¢, $10, 9¢, $100, 20¢ and the like. If an M2C Subscriber doesn't have enough money in their virtual bank to qualify them for the Free Gift Cards/Coupons/Rewards they won't be able to receive the Free Gift Cards/Coupons/Rewards until they meet that requirement amount.

Any M2C Subscriber can use the "Mishare" icon tab which allows them to receive virtual money from other M2C Subscriber's bank vaults by answering other M2C Subscribers "MiO" statements. When responding to other M2C Subscriber's "MiO's" they can add the "Mishare" Request Symbol that will include their request for money to be transferred into their own virtual bank account.

M2C Subscribers receiving the "Mishare" request don't have to give away any money if they don't want. The purpose of the "Mishare" feature is designed for all M2C Subscribers who want to offer money from their own virtual bank account to help other M2C Subscribers in a charitable way who don't have enough money in their own virtual bank accounts to qualify for the Free Gift Card/Coupon/Rewards.

For example, an M2CSMP M2C Subscriber or Subscriber "A" answers another member "B"'s "MiO" under the tab "MiPost" using user interface devices 112 and/or 116. Before John engages or engages the "MiPost" submit icon with his response he engages another tab labeled "Mishare".

"Mishare" provides a virtual symbol box in which A requests 40¢ from B. B can either deny the request or give A 40¢ from her own Virtual Bank via a virtual symbol box on B's page. Accepting the request transfers 40¢ out of B's Virtual Bank into A's Virtual Bank.

If the M2C Subscribers have any money left over in their bank vault after spending the required amount to obtain the Free Gift Card/Coupon/Rewards, such left over amount becomes the starting point for any additional accumulated money that M2C Subscribers "MiO's, Penny Icon endorsement engages will be added to. Each Free Gift Card, Coupon, and Rewards has various award amounts that M2C Subscribers will be required to reach in order to qualify for that particular reward.

For example, a merchant offers a $1 coupon for 50% off of dishwashing detergent. This coupon requires M2C Subscribers to have 100¢ in their virtual bank vault before being able to redeem the $1 coupon. Any M2C Subscriber who has 100 pennies in their virtual bank vault can now purchase the coupon and get 50% off the purchase price of the item. McDonalds may include 50¢ coupon for a double cheeseburger that requires M2C Subscribers to have 50¢ in their virtual bank vault in order to redeem the 50¢ coupon.

M2C Subscribers can print their coupons or have the coupons displayed on the mobile user interface devices 112/116 which can be scanned at merchant stores when they redeem their coupon. M2C Subscribers can purchase gift items earned using devices 112 and/or 116 for example.

M2C employs the latest technologies regarding scanning Bar Code/QR code processes for its M2C Subscribers' devices 112 and/or 116 so M2C Subscribers can redeem the items right off of their own mobile user interface devices 112 and/or 116 when they accumulate enough pennies to earn them the Rewards they've won.

The M2C PC & Mobile App embodiments include a separate in box message center called "Mibrand" whose main focus is centered on M2C Subscribers bragging about their favorite Brand/Brands, Products & Services. Any M2C Subscriber responding to the originating M2C Subscribers Mibrand opinion made it will add 2 cents to the originating M2C Subscriber's bank vault. Each time an opinion is provide about the originating member's favorite Brand/Brands, Products & Services their account is credited 2¢.

M2C will offer advertiser's a way to publish their company links on M2C Platform. For example, merchants may have a direct link on "Mibrand Message Center" where M2C Subscribers can click onto their company's home page directing them to any number of specific advertiser products via the M2CSMP.

In at least one embodiment, this would be considered a back channel for economic activity by M2C Subscribers that would lead to large volumes of on-line M2C Subscribers desiring to redeem rewards that would provide large amounts of value to companies that purchased ad space from M2C.

Product/service opinions made by M2C Subscribers and the process thereof will change and optimize the opinion giving via the business model platform that encourages M2C Subscribers to recognize and brag on Products and Services.

The M2C PC & Mobile app etc. can place the "MiBrand" icon tab on the page of user interface devices 112 and/or 116 for example. When tapped or engaged an array of various company Brands, Products & Services will pop up where advertiser companies who want their products displayed on the first page can pay a higher premium rate to assure they get the best ad spot location available.

For example, an M2C Subscriber likes to purchase a book online bookstore. The book requires 1,000¢ for the M2C Subscriber to be able to purchase the book. The M2C Subscribers can click a link for the bookstore located under the "Mibrand" page where the M2C Subscribers can transfer 1,000¢ from their bank vault to an area designated on the online bookstore website.

Advertising companies may use any number of on-line transfer electronic systems on their website's that act as an acceptance terminal where M2C Subscribers can redeem their Free Gift Card/Coupon/Rewards.

Another embodiment relates to the "Incentive Reward Gift Card Program" may be implemented for M2C Subscribers to use a predetermined monetary value number system. When M2C Subscribers reach the predetermined award amounts listed below an electronic mechanism is activated triggering flashing lights, words that can say Gold, Platinum, or Diamond that include the dollar amount won.

Gold—$1
Platinum—$2
Diamond—$3

When any M2C Subscriber reaches one of the levels mentioned above the M2C Subscriber will receive a Free Gift Card/Coupon/Reward from any number of advertising companies that M2C sells ad space to on its site, helping advertisers aim their ads at specific target groups of M2C Subscribers' profile data. M2C will also make money through revenue-sharing agreements with developers who offer apps on M2C: M2C will hand over a certain amount of "public" profile data to the app makers, enabling them to personalize the experience of the app's end users.

One of the goals of M2C is to promote giving and receiving opinions in return for Free Gift Cards/Coupons/Rewards by selling big marketers volume impressions online, by running ads at their own site based not on keywords but on the actual tastes and preferences of M2C Users. M2C data will contain not only the user's demographic data, but also data about their online and offline likes and dislikes and those of their family and friends.

M2C will use advertising methods that are unique to its own business model platform. M2C Subscribers will have the ability to remove ads from their entire profile page on their PC/Mobile wireless device altogether by opting to block ads under the "Privacy Settings" page where it might say "Option Out."

When on-line M2C Subscribers sign up, they will have the option available to them. For those who wish to exercise this feature they will not be able to access any of the actual benefits that "M2C" Free Gift Cards/Coupons/Rewards Program offers and will be assured none of their personal information can or will be used by any of the advertising companies used by M2C Corporation.

At any time an M2C Subscriber can opt in to sign up for the Free Gift Cards/Coupons/Rewards Program even if they originally signed up under the Privacy "Option Out" Tab.

Once an M2C Subscriber mentions they are a fan of "Nike" or any other sportswear brand for example, related ads will appear on their page for companies and websites selling them. M2C advertising system ensures that the right ad is displayed to the right customer, since the ads are selected for an individual page based on the interests and likes of the user by rewarding M2C Subscribers through advertiser Gift Cards, Coupons, and Rewards.

M2C Subscribers who select to take part in the Free Gift Cards/Coupons/Rewards Program will be informed of the Privacy Settings Page that any and all M2C Subscriber data will and can be used by M2C Corporation, Advertising Companies, and any third party interest. This indicates how M2C Subscribers qualify using and spending virtual dollars on the M2C Platform in being able to receive the Free Gift Cards, Coupons, and Rewards.

M2CSMP will offer a new mobile wireless smart phone methodology for receiving hearing and communicating back and forth during actual live voice messaging in real time. Any land line or smart phone user that carries the M2C app will be able to call another land line or mobile wireless smart phone device that replays an analog or digital recording of a user's voice mail message.

Any time during a voice mail message that's being left by the caller on another person's land line or mobile wireless smart phone device where a person who's receiving that call on their land line or smart phone device can now Voice Activate and start talking directly to the caller via intercom by saying, M2C or something to that affect.

The M2C Subscriber can be anywhere within a certain range of distance set forth by M2C Company when answering the land line or mobile wireless smart phone device in real time as its ringing and not have to get up to answer it physically once the M2C Subscriber's activate the M2C, "Voice Activation Mechanism Analog."

The M2C Subscribers can either let it go to voice mail where the M2C Subscribers can hear what's being said from a land line or mobile wireless smart phone speaker device or the M2C Subscribers can interrupt their voice mail message by the caller who's leaving the M2C Subscribers a live message right as it's happening in real time by just saying, M2C vs. Hello. Once the mobile wireless smart phone speaker application hears the M2C Subscribers say, M2C it will automatically activate a live talk mechanism in their mobile wireless smart phone device that lets the M2C Subscribers talk live to the person who just called.

In one embodiment the M2C PC & Mobile App will have a box titled: "Mimeeting". With "Mimeeting" the M2C Subscribers can conduct their own webinars on the "M2C" Platform. M2C Subscribers can select whom they want to invite openly or privately through an automatic invitation registration process through modern technologies available to "M2C".

The M2C Subscriber engages the "Mimeeting" tab which opens a window the M2C Subscriber's can send to friends or initiate a public invitation from the M2CSMP.

In at least one embodiment it includes a customized fill-in the blanks section field. M2C Subscribers can register to attend by clicking the MiRegister tab which may include a customized fill in the blanks section field.

There are a number of ways to start the webinar meeting. In one example, the M2C Subscriber engages the "Mimeeting" tab opening a button that says "Begin Mimeeting" which starts the meeting.

There will be numerous "Miscreen" options available to share screening with attendees. Additionally there will be numerous options for M2C Subscribers to choose various audio preference's once they've arrived such as computer mic speaker or call in through phone.

Every "MiMeeting" M2C Subscriber host that sets up a meeting will receive various quantities of Pennies transferred into their virtual bank vault after the meeting starts if they've chosen the "Opt-In Requirement Choice Selection" under the "Privacy Settings" page which allows them to participate in the Free Gift Cards/Coupons/Rewards Program. Any M2C Subscriber who hasn't chosen the "Opt-In Requirement Choice Selection" to receive Free Gift Cards, Coupons, and Rewards can still partake in the "Mimeeting" Webinar operational function however they won't be able to access any of the actual the M2C Free Gift Cards/Coupons/Rewards Program Offers.

The M2C PC & Mobile App includes a profile page with area's such as a Search Window, Member Profile icon, Mibrand, Miphoto, Mimeeting, Miphovid, MiNews, MiFriends, MiMail, MiBank, MiNotification, MiOpinion icon's, etc. M2C will offer value reward incentives for all opinion responses made.

M2C advertising rewards program opens its on-line business model platform to any and all companies who wish to purchase advertising slots by offering M2C Subscribers Free Gift Cards/Coupons/Rewards in exchange for getting the chance to advertise their companies' products to the tens of millions of on-line M2C Subscribers. Companies can opt to purchase ad space on M2C User page's or sign on for premium advertising platform packages. The M2C advertising platform package will allow companies to place ads in the running streams of M2C window's such as MiNews, MiMail, Mibrand, icon's and the like, both on their user interface device 112/116.

M2C ads on MiNews, MiMail, and Mibrand icons will link to specific areas of another app on a user's interface device 112/116 based on what it is a friend made an "Opinion" about. For example a friend takes a video with Viddy. Viddy could pay M2C to create a special type of "OPINION LINK."

When the friend engages the special "MiO" Link" his or her video from Viddy on M2C will create a link that, when engaged, links them directly to that specific video within the Viddy app (assuming it's installed on the user's phone or PC, otherwise, it would link to the app store).

This could be the same for many types of apps stored on a user's interface device 112/116: For example, reading and purchasing a book from "Amazon". Let's say an M2C Subscriber engages the special "OPINION LINK" of his or her favorite book via "Amazon", then clicking on it brings the user to the exact book the opinion was made about on "Amazon" website.

M2C gets paid for the promotion and App developers would benefit by having M2C Users being directed to specific and relevant places in their apps (or if the user doesn't have the app, M2C can link them directly to the App Store). These are just a few examples for multiple mobile app types.

The M2C will offer Live on-line mobile wireless smart phone video stream platforms through streaming servers capable of delivering Live video streams on demand. M2C Live on-line mobile wireless users will operate in the same manner as the non-video stream M2C business platform where friends or public M2C Subscribers can give their "Opinions" which places 2¢ in the originator members Bank, Vault, or Penny Jar.

Using the Penny Icon Symbol for M2C Subscribers responding back to the originating members Live on-line mobile wireless smart phone video stream. M2C Users will still have to click on their "MiO" icon symbol when making a response to the Live video stream continent that's being shown.

M2C Live will offer in-stream ad commercial videos that will appear before the user so they may watch an Internet video. The in-stream video ad commercials can last from anywhere from 10-30 seconds or whatever time increment M2C selects to use.

For example, the user scrolls through the M2C Live Feed to see what friends and family or other M2C Subscribers are putting up in real time and in-stream ads are peppered into the Feed.

When any M2CR Subscriber responds to another M2CR Subscriber Live video stream by engaging the Penny Icon Symbol, such response triggers an automatic placing of 2¢ in that M2C Subscribers Bank, Vault or Penny Jar. Every response keeps adding 2¢ onto the last 2¢ in that M2C Subscribers Bank, Vault, or Penny Jar until it accumulates and reaches a predetermined monetary value number.

When the predetermined monetary value number is reached it triggers a flashing light with words that can say Gold, Platinum, or Diamond based on the specific dollar amount that is reached below:

M2C—Incentive Reward Gift Card Program
Gold—$1
Platinum—$2
Diamond—$3

The M2C Live On-Line Mobile Wireless Smart Phone Video Stream Component on one or more user interface devices 112/116 will operate in the same fashion to encourage the behavior of its M2C Subscribers to provide their opinions via Live video stream "Opinions" to participate in the "Incentive Rewards Program".

M2C Live Video Stream M2C Subscribers will receive Free Gift Cards, Coupons and Rewards from any number of advertising companies that M2C sells ad space to on its site, helping advertisers to forget their ads at specific groups of M2C Subscribers, based on elements of members' profile data.

Alternatively, the M2CSMP Live Platform will offer its on-line mobile wireless smart phone users an "Alternative Option Selection Choice." Operating in a similar manner and scope as the M2C s/Live where friends or public M2C Subscribers can provide their "MiO or Penny Icon Symbol" responses for enabling other M2C Subscribers receives 2¢ added onto the last 2¢ in the originating members virtual bank accounts.

M2C Live mobile app will include an "Option" tab for user's members who reach the winning predetermined monetary value number that M2C s/Live offers M2C Subscribers Free Gift Cards, Coupons, and Rewards from advertisers once they reach the Gold, Platinum, or Diamond Levels.

When any on-line/mobile wireless M2C Subscriber reaches a winning level for the Free Gift Cards, Coupons, and Rewards Program a pop up window on their screen of their mobile user interface devices 112/116 will appear with two "Options" for them to choose from.

The window on the user's on-line mobile wireless device 112/116 will show an "Accept or Decline" icon symbol. If an on-line mobile wireless user engages the "Accept" icon symbol they will receive the Advertiser Company's Free Gift Card, Coupon, or Reward.

An ad from a company who is giving away the Free Rewards Gift Card will appear on the front screen of their mobile wireless user interface device 112/116 with the amount of the Free Rewards Gift Card, Coupon accessible by using banner ads, or visual QR codes (images that can be scanned from mobile user interface devices 112/116 like bar codes, and can be used like coupons for special offers, etc.

If an on-line mobile wireless M2C Subscriber wants to try for a higher Incentive Rewards Gift Card, Coupon at a later time and date they can chose the "Decline" icon symbol which will immediately return them to their original M2C s/Live social media M2C Subscriber page. Once back on their M2C s/Live M2C Subscriber page it will display the Incentive Rewards Gift Card level they are currently at including the amount of money they have accumulated in their M2C Subscriber Bank, Vault or Penny Jar.

By engaging the "Decline" icon symbol allows that M2C Subscriber to pass on the current Free Gift Card, Coupon, Rewards offer and try for the next highest level in the Free Rewards Gift Card Program to be offered at a later time and date. Reaching the next highest level will be based on that M2C Subscriber getting enough "MiO or Penny Icon Symbol" responses from other M2C Subscribers to accumulate 2¢ added onto the last 2¢ in that M2C Subscriber's virtual Bank, Vault or Penny Jar.

One embodiment includes M2C Games Application Distribution and Monetization App M2C Games Platform which allows on-line mobile wireless games to be played and shared across the Globe by M2C Subscribers, developers, publishers, and advertisers. It offers Free on-line mobile wireless casino games including casino table games, casino slot games and more such as Poker, Kino, Bingo, Black Jack, and Slots just to name a few.

The games have numerous variations, whether explicitly provided for by the specification or implied by the specification below regarding how the games can be played. The M2C Games Platform may or may not be interconnected to the M2C Incentive Rewards Program Platform that includes Free Gift Cards, Coupons, and Rewards.

For example, M2C Games will operate similarly under the same manner of technology regarding the activation methodology of placing 2¢ in an originating M2C Subscribers Bank, Vault or Penny Jar etc All games will require using the 2¢ accumulation mechanism process that's used on the M2C "Incentive Rewards Program Platform". For example, using Poker games such as Texas Hold 'Em, Omaha, or the like, M2C Subscribers can invite real M2C Subscribers to play with them or play alone on a virtual computer assimilation portal with fictitious players versus real M2C Subscriber players. To initiate play M2C Subscribers will click on the "Migames" Icon Symbol tab to log in with their "M2C" username and password.

Alternatively M2C Subscribers can also log in with their Google, Yahoo, Facebook or Twitter accounts etc. Once logged in the M2C Subscribers will see the M2C Subscriber's player profile image and other data that may include all favorite games and amount of Pennies the M2C Subscriber's have accumulated in their virtual bank account in the M2C "Incentive Rewards Program" SITE. There'll be a number of ways for M2C Subscribers to communicate with multiple M2C Subscribers who want to play against each other in real time as bets are being wagered.

The money used to wage all bets with will come from all M2C Subscribers virtual bank accounts on their "M2C "Incentive Rewards Program" Page. Money will be added and subtracted from this account according to the outcome for each hand or game played where M2C Subscribers can raise, call or fold depending on the type of game being played.

For example: John Doe wins the pot in poker which has 8 M2C Subscribers playing in that game. John Doe's beginning virtual bank account had $6 in it before he won the pot. After winning he now has $8 in his virtual bank account based on the bets of other M2C Subscribers John Doe played against and won. Now let's say 3 M2C Subscribers used up all their accumulated Pennies in their M2C virtual bank accounts during the game played. Those 3 M2C Subscribers profile image and names will disappear from the game portal altogether while the 5 M2C Subscribers who still have money in their virtual banks accounts will remain.

The M2C advertising marketing exchange process can work in the following manner. M2C Subscribers will see various advertiser rewards/coupons offered to them on the M2C website that allows them to instantly connect to product and service discounts.

Advertising company's product and service discounts and rewards will be linked through QR Code/Bar Code's or the like displayed on the M2C website when M2C Subscribers want to redeem savings from their mobile user interface devices 112/116 at merchant stores. The M2C Subscriber may have the cashier scan their QR Code/Bar Code or the like on their mobile devices 112/116, automatically adjusting their final purchase price to include the advertiser's rewards/coupon discount in the final tally.

Each time an M2C Subscriber redeems an advertisers reward or coupon discount via scanning their QR Code/Bar Code or the like they will automatically receive a predetermined set amount of virtual credits/dollars that will appear in their M2C Virtual Bank Account located on each M2C Subscriber's platform front page or the like.

A new M2C Subscriber who signs up will have zero credit/dollars in his or her virtual bank account on their own platform page. They can redeem any number of advertiser company rewards or coupon discounts offered on their front page at any time. "M2C Subscriber 1" decides to redeem a discount offer from "Target" store who is offering 10% off "Tide Laundry Detergent."

M2C Subscriber 1 goes up to the cash register attendant and shows their mobile user interface device 112/116 displaying discount QR Code/Bar Code or the like. The attendant scans the code right off their device. Once the scan is done it immediately lowers the original price of the washing detergent by 10% and at the same time "M2C Subscriber 1" retains X amount of virtual credits/dollars in his or her online virtual bank account on the front page of their M2C page.

For this example "M2C Subscriber 1" who signed up as a new member has zero dollars in their virtual bank account. After making their first purchase with the 10% discount they now have $100 in virtual credits/dollars accumulated into their M2C virtual bank account by activating the M2C advertiser reward/coupon discount QR Code/Bar Code mechanism.

Another embodiment relates to advertising. "Miadds" relates to a marketing exchange process enabling M2C Subscribers to see various advertiser rewards/coupons offered to them on the M2C website on user interface devices 112/116 for example, allowing them to instantly connect to product and service discounts.

Advertising company's product and service discounts and rewards will be linked through QR Code/Bar Code's or the like displayed on the M2C website. M2C Subscribers who want to redeem savings from their mobile user interface devices 112/116 at merchant stores. They have the cashier scan their QR Code/Bar Code or the like on their mobile user interface devices 112/116 automatically adjusting their final purchase price to include the advertiser's rewards/coupon discount in the final tally.

Each time an M2C Subscriber redeems an advertisers reward or coupon discount via scanning their QR Code/Bar Code or the like, they automatically receive a predetermined set amount of virtual credits/dollars that will appear in their M2C virtual bank account located on each M2CR Subscriber's platform front page or the like.

A new M2CR Subscriber who signs up will have zero credit/dollars in his or her virtual bank account on their own platform page. They can redeem any number of advertiser company rewards or coupon discounts offered on their front page at any time. M2C Subscriber 1 decides to redeem a discount offer from "Target" store who is offering 10% off "Tide Laundry Detergent".

M2C Subscriber 1 goes up to the cash register attendant and shows their mobile discount QR Code/Bar Code or the like. The attendant scans the coupon right off their mobile user interface device 112/116. Once the scan is done it immediately lowers the original price of the washing detergent by 10% and at the same time "M2C Subscriber 1" retains X amount of virtual credits/dollars in his or her online virtual bank account on the front page of their M2C page.

One embodiment of the M2C Platform website configures and integrates all type of other social media platform site features such as share photo, take photo, write post, like, photos, video's, comments, friends, Apps, Chats, followers, uploads, reviews and the like from sites such as Facebook, YouTube, Instagram, Twitter, Linkedin, Flipboard, Google+, and the like. This embodiment is titled: MiShuffle.

MiShuffle configures and adds to any and all social media site feature's simultaneously by cross promoting MiShuffle activities onto other social media website feature pages in real time. The MiShuffle app is found on M2C website. MiShuffle app will use the system 100 to integrate, configure and transfer any of its online social media activities right into other social media site feature pages at the same time and point when being activated from the MiShuffle app located on the M2C website.

For example, Jane Doe is an M2C Subscriber in addition to being the M2C Subscriber of such platforms as Facebook, Twitter, Google+, Instagram, and Youtube and shares photos and videos on those platforms with her friends. If M2CR Subscriber Jane Doe wants to share a photo and/or video, she uploads the photo and/or video onto her M2C page which shares them with her other social media sites such as Facebook, Twitter, Google+, Instagram, and Youtube, sending them to a few of hers friends on those other sites as well.

Alternatively Jane Doe goes to her M2CR Subscriber profile page and clicks on the Miapps icon, which brings up the All Search window. Jane Doe types the word MiShuffle into the search window and all of her other social media site links she's an M2C Subscriber of pop up vertically as described below:

Members click on each social media site they want to share the uploaded photo and/or video's she's uploaded onto her M2C page to their Facebook, Instagram, Google+ page windows for photos and videos all at the same time instantaneously. They now have to highlight and click on each one they want to share. Once they are highlighted, a friend's window pops up so that she can choose any of her friends from any of the sites her friends and her are joint members of. They can choose 2 friends, a friend on one social medium and another friend on a different social medium.

After the selection as described above, the members click on a send icon or tab and now their photo and/or video are sent to each designated selection choice made as above instantaneously, which can be verified on any of their other social media sites that will show the same photo and video uploaded on M2C page under the Mishuffall app tab. The Mishuffall app will work with any online social media site where an M2C Subscriber can cross connect.

For example all #Hashtags, dating websites, coupons, rewards, vacation websites, airline websites, bank websites, businesses etc. can cross connect and share any and all types of information and data all at the same time like the above illustration without having to send each individual website the information one website at a time. They all can receive the same information or data at the same time using Mishuffall like in the example above.

Figure 2:
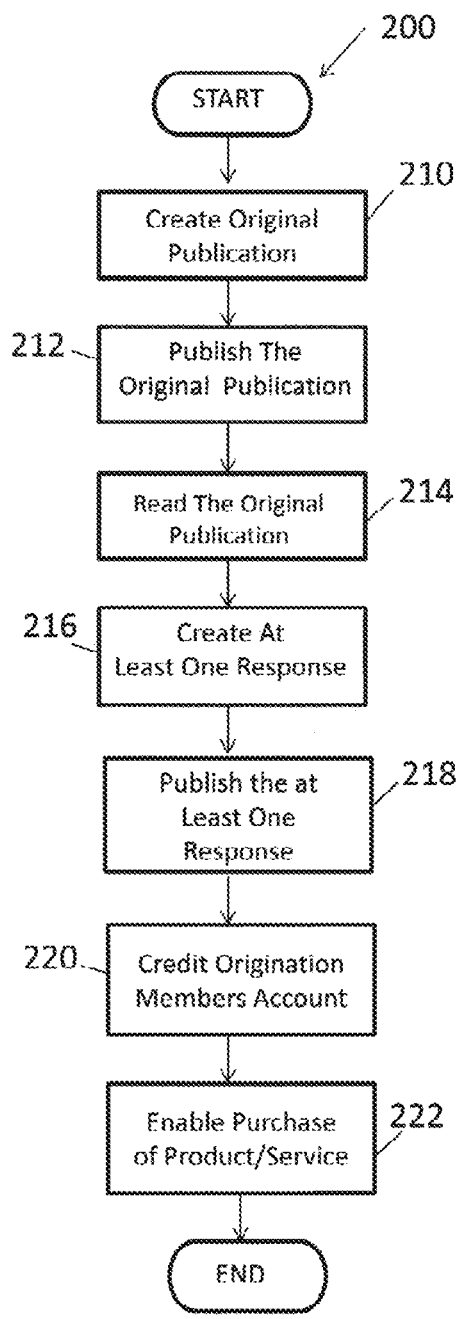
FIG. 2 illustrates a high level flow diagram of a computer implemented method in accordance with one embodiment of the present invention.

FIG. 2 illustrates another embodiment relating to a computer implemented method generally designated 200 operating on the at least one central server 100 enabling communication between social media participants in exchange for economic benefits. The computer implemented method includes creating an original publication by an originating member using a first user interface device communicating with at least the at least one central server, block 210; and publishing the original publication by the at least one central server, block 212.

The method 200 further includes reading the published original publication by a plurality of M2C Subscribers using a plurality of user interface devices communicating with at least the at least one central server, block 214 and creating at least one response to the published original publication by at least one of the plurality of M2C Subscribers, block 216.

The method includes publishing the at least one response by the at least one central server, block 218. The account of the originating member is credited a predetermined amount for each published response, block 220; enabling the originating member to purchase at least one of a product and service offered through the at least one central server, block 222.

Figure 3:
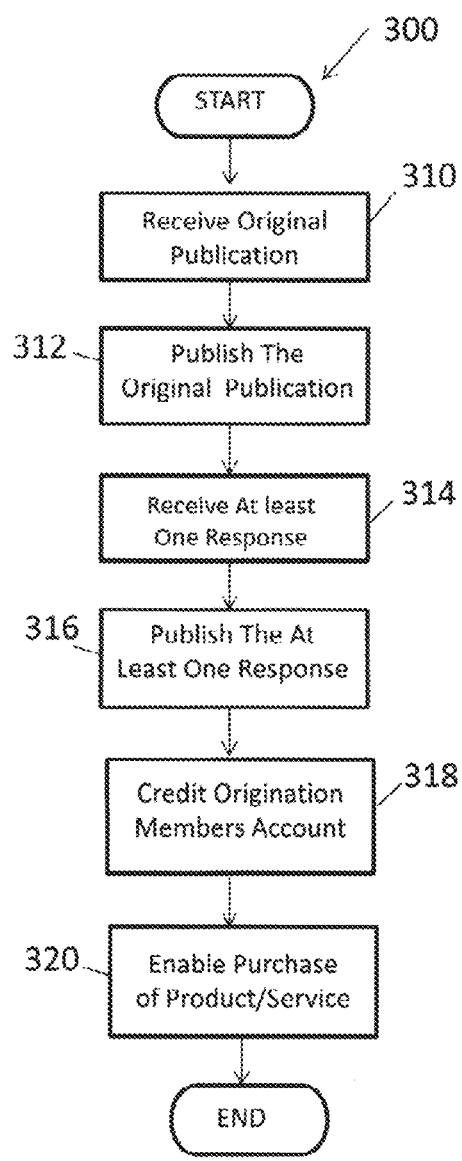
FIG. 3 illustrates a high level flow diagram of another computer implemented method in accordance with one embodiment of the present invention.

FIG. 3 illustrates another embodiment related to a computer implemented method generally designated 300 operating on at least one central server enabling communication between social media participants in exchange for economic benefits, the computer implemented method including receiving at the at least one central server an original publication by an originating member using a first user interface device in communication with that at least the at least one central server, block 310; and publishing the original publication at least one central server, block 312.

The method 300 further includes receiving at the at least one central server at least one response to the published original publication by at least one of a plurality of M2C Subscribers, block 314; and publishing the at least one response at the least one central server block 316. Additionally, method 300 includes crediting an account of the originating member based on the reception of the at least one response, block 318; and enabling the originating member at the central server to use account credits to initiate a purchase of at least third party offer, such as through a third party link, block 320.

For this example "Subscriber 1" who just signed up as a new member signed up with zero dollars in their virtual bank account however after making their first purchase with the 10% discount they now have $100 in virtual credits/dollars accumulated into their M2C virtual bank account by activating the M2C advertiser reward/coupon discount QR Code/Bar Code mechanism.

The M2C Live video Streaming Striker vs Puncher Combat Sports Betting Website Application Platform (hereinafter "Platform") will have multiple functionalities like smart open source CMS architecture, interactive design, smart UI (user interface), payment gateway integration, reliable and scalable back-end features, etc.

An embodiment relates to the M2C Live website platform for the production of its own live combat sports event by integrating social media to create live fight round purses where each fight has a total purse that is divided by the number of rounds application connected to Live Video Streaming/PPV/Bets online for direct use through its website.

M2CSMP will offer its on-line M2C Subscribers an integrated exclusive M2C fight round payout percentage purse betting methodology structure.

M2CSMP combat sports Video Streaming/PPV/Betting events will give M2C Subscribers numerous ways on how to bet and win money using the live fight round payout percentage purse and M2C Methodology structure. Winnings will go directly into their online M2C Subscriber bank accounts via the M2C Live online mobile wireless integration application. M2C Live Odds Service will be automated for direct end use by its M2C Subscriber's that will provide them with many types of exclusive fighter round purse options the fighters are paid by. The M2C Live fight round payout percentage purse splits platform will be key to how the M2C Live M2C Subscriber's payment betting methodology app works.

M2C Live will offer numerous live on-line mobile wireless betting options connected to the fighter's Individual fight round payout percentage purse split amounts.

M2C Subscribers can bet on the fighter of their choice who they think will win the round before the round starts. They may also bet on the fighter of their choice who they think won the round after a given round has ended by choosing either the Red Corner or Blue Corner fighter as the winner.

M2C Methodology will operate in a similar fashion to how the original M2CSMP operates where friends or public M2C Subscribers give their "Opinions" to be rewarded with money that goes in the originator members Bank, Vault, or Penny Jar.

The following Embodiment's listed below are given as an example only and should not be seen in a limiting manner as there are numerous other ways in which the application works: M2C Methodology works using its own live fight round purse amounts where the winner and loser of a combat fight round receives an exclusive Mi2ent predetermined payout round split purse.

The M2C Live Operation will use individual fight round purse amounts per each round fought between two fighters with the winner of the round receiving the highest payout percent offered per each individual round. An example of this would be an 80%/20% round purse split with the winner of the round getting 80% of the total amount of money up for grabs that round and the loser getting 20%.

The winner of each round will receive the highest percentage split amount offered per round purse and the loser will received the lessor split amount of the round purse offered per round. For example, M2C Live integrated fight promotion platform events will use the M2C Methodology.

The payment is based on Live M2C Subscribers betting on a winner of any given fight round before and after the round has ended. Bets will be placed by the round because fighters will be paid by the round.

Not to be seen in a limiting manner as there are numerous other examples such as round payout percentage purse split prize amount structures. AN M2C Live Combat Sports Fighting Event Production Fight Round Purse and Percentage Pay Split Methodology may look like the following illustrations below:

This M2C Live Combat Sports Fighting Production Platform Event will have 6 Individual Bout Card's with pre-set round purse prize amounts used per each Bout.

BOUT-1 Each Individual Round is worth $4,000. 3 Rounds
BOUT-2 Each Individual Round is worth $6,000. 4 Rounds
BOUT-3 Each Individual Round is worth $100,000. 8 Rounds
BOUT-4 Each Individual Round is worth $2,400. 5 Rounds
BOUT-5 Each Individual Round Is worth $10,000. 5 Rounds
BOUT-6 Each Individual Round is worth $1,000,000. 12 Rounds Six Individual Bout Cards with M2C fight Round Purse Percentage Split's per fight listed below:

BOUT-1 Rounds worth $4,000 each. Round Purse Split=Winner 80% Loser 20%
BOUT-2 Rounds worth $6,000 each. Round Purse Split=Winner 90% Loser 10%
BOUT-3 Rounds worth $100,000 each. Round Purse Split=Winner Take All
BOUT-4 Rounds worth $2,400 each. Round Purse Split=Winner 60% Loser 40%
BOUT-5 Rounds worth $10,000 each. Round Purse Split=Winner 70% Loser 30%
BOUT-6 Rounds worth $1,000,000 each. Round Purse Split=Winner 94% Loser 6%

The following illustration will use Fight-5 Round purse worth $10,000 each round out of the total purse amount of $50,000 as an example that includes the Round Purse Split=Winner 70% Loser 30%.

In round-1 of Bout 5 we have M2C Subscriber "M2C-Sub-1" who bet on the winning fighter from the Red corner as the winner of the round over the Blue corner. Using the winner 70% and Loser 30% split for this bout. At the end of round-1 M2C-Sub-1 bets $100 on the fighter in the Red corner who wins the round. M2C-Sub-1 wins 70% on top of keeping his $100 bet for a grand total of $170 that will appear in the upper corner on M2C-Sub-1's M2C Live online members Bank, Vault, or Penny Jar that can be virtual currency or real currency.

In round-2 of Bout 5 M2C Subscriber M2C-Sub-1 bets $100 on the Red corner to win before the round begins but loses because the fighter in the Blue corner wins round-2. Using the winner 70% and Loser 30% split for this bout means M2C-Sub-1 loses $70 out of his $100 bet to the company M2C Live and $30 remains in the upper corner on M2C-Sub-1's M2C Live webpage Bank, Vault, or Penny Jar that can be virtual currency or real currency.

Alternatively in accordance with one embodiment that relates to M2C Methodology, the knockout bonus payout splits are not limited to examples described herein, as there are numerous variations, whether explicitly provided for by the example or implied by the specification. If a fighter knocks out his opponent in any round and there are remaining rounds left in the fight. The winner gets his or her normal round purse percentage split amount and 100% of the remaining rounds purses. The loser will only receive whatever percent he or she had coming for the loser of the round purse split.

Example: Using Bout 5 above with 5 rounds. Let's say the Red corner knocks out his opponent in round 1 where the round purse is set at $10,000 a round. The winner in the Red corner gets 70% of round 1's $10,000 purse and the remaining 4 round purse amounts for a grand total winning of $47,000. The loser gets 30% of the first round purse he got knocked out in for a grand total of $3,000.

The following fight round purse splits listed below are just examples of numerous other fight round purse prize split amounts used in the M2C Methodology and M2CSMP.

M2C Live fight round purse split percentages listed below are as follows per each individual fight round starting at Round-1 leading up to and including 100 fight Rounds fought individually on the M2C Methodology and M2CSMP event splits below.

There will also be a Winner take all 100% fight round purse.

90%/10%
80%/20%
70%/30%
60%/40%
50%/50%
90%/10% split every round from 1 up to 100 rds.
80%/20% split every round from 1 up to 100 rds.
70%/30% split every round from 1 up to 100 rds.
60%/40% split every round from 1 up to 100 rds.
50%/50% split every round from 1 up to 100 rds.
Winner takes all 100%

The mixed payout round variation examples listed below should not to be seen in a limiting manner as there are numerous mix payout round percentages for the M2C Methodology and M2CSMP events.

Examples: First 4 rds 70/30 split Next 4 rds 80/20 split, Next 4 rds 90/10 split Rds 1 & 2 pay 80/20 and rd 3 winner takes all.
Rd 1 Winner take all, Rd 2 90/10 split,
Rd 3 80/20 split.
Rds 1 & 2 pay 80/20 and rd 3 winner takes all.
R1 60/40 split Rd 2 90/10 split
Rd 3 60/40 split Rd 4 80/20 split
Rd 5 winner take all, Rd 6 70/30 split.
Rds 1 thru 3 winner take all.
Rds 4 thru 6 60/40 split
Rds 7 & 8 90/20 split
Rd 1 Winner take all.
Rds 2, 3, 4, 5 80/20 split
Rds 6, 7, 8, 9, 10 Winner takes all.
Rds 1 thru 7 60/40 split
Rds 8, 9, 10 Winner takes all.
Rds 1 50/50 split
Rd 2 winner takes all
Rds 3 50/50 split
Rd 4 winner takes all
Rds 1, 2, 3, 60/40 split
Rds 4, 5, 6 winner takes all.
Rds 1, 2, 3, 4, 90/10 split
Rds 5, 6, winner takes all
Rds 7, 8 90/10 split
Rds 1 50/50 split Rd 2 50/50 split
Rd 3 50/50 split
Rd 4, 5, 6 winner takes all
Rds 7, 8, 9, 10 90/10 split Alternatively in another Embodiment not to be seen in a limiting manner M2C Live Website Company will cross promote two different fight league contestants where it's signed up on-line M2C Subscribers can bet on which fighter they think will win the round.

The event will promote numerous fight cards throughout the year with MMA Strikers vs Boxing Punchers using the same fight round purse percentage splits application or variations thereof disclosed herein.

The all new "M2C Live Striker vs Puncher" fight card event will produce anywhere from 4 to 20 bout fight cards in a one day event using various fight rounds such as three rounds, 3 minutes per round, four rounds, 3 minutes per round, five rounds 5 minutes per round etc. Example: Boxer John Doe vs. Jane Doe will fight using one of the many M2C round purse fight splits shown herein such as Winner take all, 70/30, 80/20 etc. Using the 70/30 round purse percentage split a mount M2C Subscriber M2C-Sub-1 bets John Doe wins round-1 which he does. Depending on the amount M2C-Sub-1 bets he will win 70% of his bet for choosing the Boxer Puncher over the MMA Striker.

First: Sign Up Process
Go to world wide web (www) M2C Live dot com
Select Register and Create Account:
E-mail address or User Name
Choose Password (7-15 characters)
[Register]
Select the type of subscription
Video Streaming/PPV/Live Bets
M2C Live accepts all major credit cards (Visa, Master Card, AMEX, PayPal).
(Must Be 18 Years Old and Agree To the Terms of Use and Privacy Policy).
Enter your credit card information
First Name
Last Name
Card Number
Expiration Date
Digit Security Code on back of card
Now Click: Start Membership
Click Start Membership
the M2C Subscriber will now be redirected to the homepage, where the M2C Subscriber can instantly begin streaming by Login.
E-mail address or User Name
Choose Password (7-15 characters)
Second: Set Up Betting Account
Account Terms and conditions of use. Welcome to M2C Live. Before the M2C Subscriber can use the services, the M2C Subscriber needs to open an account and deposit funds. Please read these Terms and Conditions carefully before opening an account with us.
Please also read our Privacy Policy, Cookie Policy, Dispute Resolution Policy, Trust Deed and the provisions regarding the M2C Live Charges which are incorporated by reference into these Terms and Conditions. If there is any inconsistency between these Terms and Conditions and any of the documents listed above, these Terms and Conditions will prevail.

By clicking the "I Confirm" button or the like on the account opening screen, the M2C Subscriber agrees to be bound by these Terms and Conditions.

Third: Betting—General Conditions

M2C s Live provides an online mobile platform upon which the M2C Subscriber can enter into various betting transactions in relation to the M2C Live integrated fight promotion events that use the M2C Methodology.

M2C Live M2C Subscribers can bet on each fight round as an individual bet or in a wagered bet against other M2C Live M2C Subscribers on the platform.

One can enter into betting transactions either:
on our site (the "Website Service");
by telephone (the "Telephone Service");
by mobile telephone ("M2C Live Mobile"); or
by the Application Programs Interface ("API").

(Please note that not all M2C Live betting products are available through each of the betting channels set out above.)

In these General Conditions when we refer to "the Services" we mean all the services listed above (where applicable).

In these General Conditions references to "M2C Live", "we", "us" and/or "our" are to whichever M2C Live group company is providing the Services to the M2C Subscriber as set out in the Specific Conditions applicable to the M2C Subscriber's betting transaction.

The Betting Process

After an M2C Subscriber signs up for a 30 day video streaming/PPV/Live Bets subscription or single event purchase at a cost to be determined he/she can now log into their M2C Live account where M2C Subscribers can see the M2C Methodology and M2CSMP event. M2C Subscribers bet after fight rounds have ended or before the round begins where they click on the tab that says, "Bet the Round". This will open a window that shows a "Red Corner" and "Blue Corner" symbol. If the M2C Subscriber bets the "Blue Corner" he/she clicks on the "Blue Corner" icon tab which opens a window that says, "Bet Amount".

[Bet The Round]
[Red Corner] or [Blue Corner]
[Bet Amount] $2 $4 $6 $10 Other

The M2C Subscriber inputs a specified amount of money he/she wants to bet which he/she has to have enough money in their M2C Live M2C Subscriber Bank Account that would cover a loss if one was to occur after the bet they made.

For example, and not to be seen in a limiting manner, the M2C Subscriber 1 (UM1) bets $10 dollars after round 3 ends on the fighter in the "Red" corner using the M2C Live 80/20 fight purse payout percent methodology.

Before the next round begins the M2CSMP Open Scoring System (M2CSOSS) that will be integrated and connected to the official judge's electronic score cards on the M2CSMP Live website will show the fighter in the "Red Corner" won round 3.

In M2C Subscriber (UM) UM1's M2CSMP Live online bank account found on his M2C Subscriber page will show M2CSMP M2C Subscriber or Subscriber A just received $8 added to his $10 bet because he won 80% of his original $10 bet for a total of $18.

In round 4, for example, A bets $4 on the fighter in the "Red Corner" to win and the fighter in the "Blue Corner" is the winner. A loses $3.20 that will come out of A's M2C Live Bank account and go into the M2C Live business bank account or the like as winnings for the company. The remainder 20% of A's $4 dollar bet using the M2C Live 80/20 fight purse payout percent methodology will stay in A's M2C Live M2C Subscriber bank account. So, A keeps 80¢ out of his $4 bet.

The M2CSMP Methodology Production event will integrate the online M2C Subscribers who've purchased Streaming/PPV/Bets for the process to judge the winner of the fight rounds.

Method of M2CSMP

After each round that has been fought, M2C Subscribers who have purchased streaming/PPV/Bets will determine the winner of a given round by way of majority decision through their bets. After a round is over M2C Subscribers will have 15 to 30 seconds to pick who they think won the round.

Example:

At the end of Round-1 500 bets where placed by M2C Subscribers for the winner of the round. 240 bets have been made for the "Red Corner" as the winner of the round and 260 bets have been made for the winner of the "Blue Corner".

In this example the "Blue Corner" is the winner of round-1 based on majority bets made by M2C Subscribers for the winner of round 1.

As an alternative way for judging the winner of a round will be based on the following example. The winning M2C Subscriber majority round pick bets can be judged against the ruling of the official judges at ringside.

Before the beginning of the next round the official judge's score cards will show the winner they've selected from the previous round that was just fought in using an open scoring system.

Five to Ten seconds before the start of the next round the official judges score card selection for the previous winner of the round will pop up on the M2C Subscriber's page as either "Red Corner" or "Blue Corner" signifying the winner of the round. For example, the M2C Subscribers who wagered 260 bets on the "Blue Corner" and won in the example above will now be compared to the official judges score card decision at ringside.

If the majority winning round bets made by the M2C Subscribers who picked the "Blue Corner" matches what the official judges score card shows at ringside as the winner of the round they can win extra prize's and rewards.

Alternatively in another Embodiment not to be seen in a limiting manner M2C Live Website will have a process way for M2C Subscribers to bet against each other by submitting a challenge bet that includes a specific dollar amount they want to put up as a bet for other M2C Subscribers to take the bet.

A challenge window will show on M2C Subscriber's home page with M2C Subscriber's name, icon, user code who would like to issue and accept a challenge bet.

This window will show how much money the challenge bet is originally made for at the end of each round with the M2C Subscribers name, icon, or user number.

How it Works:

Initial challenge offers can be made by any on-line M2C Subscriber who's paid for and watching the Lived Streaming/PPV feed by clicking: I Challenge.

Other online M2C Subscribers will see various challenges on their home page during the fight event where they can respond to a challenge bet by clicking the Icon button that says, I Accept.

Once a bet is submitted and accepted by another M2C Subscriber that bet is officially live using the current fights round purse percentage pay structure for example:

Challenge Bet Process

M2C Subscriber "A" makes challenge Bet on the Blue Corner for $100.

M2C Subscriber "B" accepts challenge Bet on the Red Corner for $100.

Winner of the Round is RED CORNER.

Payout:

M2C Subscriber "A" loses $80 out his/her M2C Subscriber bank account.

M2C Subscriber "B" wins $80 that goes into his/her M2C Subscriber bank account.

In another Embodiment an Infra-red laser guided scoring system integration or the like that will be connected to a live jumbotron, boxing ring and other equipment that will be used to score the round from a video imaging process that captures live punches landed in the scoring areas on each fighter.

M2C will use state of the art satellite imaging technology through live video monitoring body recognition systems that will capture live punches landed in the scoring area in real time through numerous video cameras setup and connected to the jumbotron, boxing ring and other equipment. The process may include a laser guided satellite imaging device for accuracy.

One of numerous ways how this can work is to have each fighters body x-ray image scanned before the fight starts with the fighters wearing their boxing trunks, gloves, and full body scanned.

The scan will use state of the art technology similar to a scanning machine used at an airport or hospital that uses air and x-ray image technology and the like. The fighter will go through a similar process where his/her images will be captured and stored in a computer data base application system.

The computer stored data images of each fighter will be integrated into a software application that connects the stored images into a state of the art satellite technology guiding system on the jumbotron/boxing ring and other equipment or the like by using infra-red scoring video cameras or the like located on the jumbotron/boxing ring and other equipment. Every punch thrown by both fighters during each round of the fight will be compared to their previous body scan x-ray images stored in the computer data base application that has an electronic image of each fighter's body captured before getting in the ring.

A proprietary computer software application will use each fighters own body scan data information taken before the fight that automatically compares early images to live punches that land in the scoring areas on the fighters.

This M2C Live software computer application will capture the most accurate punches landed through previous body scan imaging that captures any punch in live motion through numerous cameras strategically placed on the jumbotron/boxing ring and other equipment. A scoring application will be used for pin point laser guided accuracy or the like where numerous cameras will only snap pictures and record instant video body recognition images when punches land to give the most accurate scoring ever used in combat sports.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure.

This disclosure provides exemplary embodiments of the present invention, the scope of which is not limited by these exemplary embodiments. Numerous variations, whether explicitly provided for by the specification or implied by the specification, such as variations in structure, dimension, type of material and manufacturing process may be implemented by one of skill in the art in view of this disclosure.

An embodiment is a computer implemented method for operating on at least one server, operable to communicate over the internet with at least one client device, enabling betting among M2C Subscribers, the computer implemented method comprising: providing at least one computing system; providing at least one data processor; providing a platform; receiving a wager at the at least one server from a first M2C Subscriber using a first user interface device in communication with the at least one server; providing a wager; publishing the wager at the at least one server; receiving at the at least one server at least one response to the wager by at least one of a plurality of M2C Subscribers; publishing the at least one response at the at least one server; using an M2C Methodology; crediting an account of the first M2C Subscriber with a percentage payment based on the predetermined Percentage Round Purse Reward Amount (PRPRA), wherein the percentage payment is based on the integration of the wager on a winner and a loser of any given fight round before and after the round has ended; wherein the computing system comprises a tangible, non-transitory computer readable media comprising machine-readable executable code operable on the at least one server.

In one embodiment, the platform is M2CSMP-1, wherein the round is a combat round selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

In one embodiment, the platform is M2CSMP-1 platform, wherein the round is a competition selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

In one embodiment, the platform is M2CSMP-1, wherein the round is a the combat round is a round that presents an opportunity for each character involved in a combat situation divided into individual rounds to take an action against each other that vary in length and number depending on the competition; wherein the round lasts at least six seconds, during which a round a character can perform a limited number of actions between two individuals or two groups; wherein the combat round comprises techniques used by the combatants against each other: a punch comprising jab, cross, hook, uppercut, spinning backfist, elbow punch, forearm punch; a kick comprising front-kicks, side kicks, back kicks, hook kicks, roundhouse kicks, wheel kicks, and spinning kicks; or kneeing comprising front kneeing and roundhouse kneeing.

The display can be a live combat event which will be video recorded to be used as example video presentations on M2CSMP to be used at a later date and time where the prerecorded archived videos to be used on a machine via jumbotron video screen recording example presentations for M2CSMP to be used at a later date and time where the prerecorded archived videos of M2CSMP will be used to help introduce, educate, and grow awareness about the M2CSMP website that M2CSMP Subscriber User Members can place live bets on.

M2CSMP-1 is an M2CSMP wherein the round is a wherein the PRPRA is a split comprising unlimited variation combat round split percentages for the winner and the loser for every round from 1 round up to 100 rounds, comprising: 100% and 0%, 90% and 10%, 80% and 20%, 70% and 30%, 60% and 40%, or 50% and 50%; wherein every round winner takes all 100% in the first 4 rds, 70/30 split in the next 4 rds, 80/20 split in the next 4 rds 90/10 split in the next 4 rds; wherein Rds 1 & 2 pay 80/20 and rd 3 winner takes all; Rd 1 Winner take all, Rd 2 90/10 split, Rd 3 80/20 split, Rds 1 & 2 pay 80/20 and rd 3 winner takes all; R1 60/40 split Rd 2 90/10 split, Rd 3 60/40 split Rd 4 80/20 split, Rd 5 winner take all, Rd 6 70/30 split, Rds 1 thru 3 winner take all, Rds 4 thru 6 60/40 split, Rds 7 & 8 90/20 split, Rd 1 Winner take all, Rds 2, 3, 4, 5 80/20 split, Rds 6, 7, 8, 9, 10 Winner takes all, Rds 1 thru 7 60/40 split, Rds 8, 9, 10 Winner takes all, Rds 1 50/50 split Rd 2 winner takes all
Rds 3 50/50 split
Rd 4 winner takes all
Rds 1, 2, 3, 60/40 split
Rds 4, 5, 6 winner takes all.
Rds 1, 2, 3, 4, 90/10 split
Rds 5, 6, winner takes all
Rds 7, 8 90/10 split
Rds 1 50/50 split Rd 2 50/50 split
Rd 3 50/50 split
Rd 4, 5, 6 winner takes all
Rds 7, 8, 9, 10 90/10 split In another embodiment, the invention is a system comprising: a betting server providing data related to a game; a plurality of betting instances each betting instance in communication with and receiving betting data from a betting server, each betting instance includes a peer-wagering module to receive a wager amount from a member associated with the corresponding the betting instance, each betting instance associated with a competition and a competitor participating in the competition; and a transactional server to receive from each peer-wagering module the wager amount, and secure an amount of funds previously deposited and associated with each of the associated corresponding competitors, the secured fund amount equal to a percentage of the respective wager amount, the funds being secured such that they cannot be transferred, withdrawn, secured for a different wager; wherein each server comprises at least one computing system having at least one data processor.

In another embodiment, the invention is wagering system operating on at least one central server enabling betting among M2C Subscribers, the system comprising: at least one computing system; at least one data processor; a platform selected from the group consisting of: M2C Live video streaming Striker vs Puncher Combat Sports Betting website application platform, a wager at the at least one central server, a first member using a first user interface device in communication with the at least one central server; a means for receiving at the at least one central server at least one response to the wager by at least one of a plurality of M2C Subscribers; a means for publishing the at least one response at the least one central server; an M2CSMP Methodology or app for individual combat fight round purse split amounts between two combat fighters; and a means for crediting an account of the first member with a percentage payment; wherein the percentage payment is based on M2C Live M2C Subscriber's bet on a winner and a loser of any given fight round before and after the round has ended; wherein the computing system comprises a tangible, non-transitory computer readable media comprising machine-readable executable code operable on the at least one central server.

In another embodiment, in an open scoring system using referees, officials, judges, committee, or commissions, the scores will be displayed on the venue display screen showing the non computer Implemented Betting (PRPRA) combat event round results of the winner and loser of the round that will display the percentage payout split distribution of money/reward of how much money the winner makes and loser makes.

A jumbotron can be used as a live big screen display unit that is used to show the fights for better viewership purposes that fight fans not close to the ring can see it close up through the huge jumbotron venue screen. Fans across the venue will also be able to see a big clear close up of the outcome of the official open scoring system results that include the percentage payout split distribution of money/rewarded to the winner and loser of a round.

In one embodiment, the M2C Methodology, PRPRA, and M2CSMP comprise a jumbotron and the platform is called M2CSP-2.

In another embodiment, the M2CSP-2 does not require a computing system, data processor, display system, or server, when the display device is a jumbotron, jumbovision, messageboard, scoreboard, whiteboard, blackboard or large screen displaying the scores, wherein the wager is performed at the venue, by the M2C Subscribers.

In another embodiment, the platform is M2CSP-2, wherein the display system or device is a jumbotron, jumbovision, messageboard, scoreboard, whiteboard, blackboard or large screen displaying the scores; with or without a computing system, data processor, display system, and/or server.

The invention claimed is:

1. A computer implemented method for operating on at least one server, operable to communicate over the internet with at least one client device, enabling betting among M2C Subscribers, the computer implemented method comprising:
   providing at least one computing system;
   providing at least one data processor;
   providing a platform;
   providing at least one display system;
   receiving a wager at the at least one server from a first M2C Subscriber using a first user interface device in communication with the at least one server;
   publishing the wager at the at least one server;
   receiving at the at least one server at least one response to the wager by at least one of a plurality of M2C Subscribers;
   publishing the at least one response at the at least one server;
   using an M2C Methodology;
   crediting an account of the first M2C Subscriber with a percentage payment based on the predetermined Percentage Round Purse Reward Amount (PRPRA), wherein the percentage payment is based on the integration of the wager on a winner and a loser of any given fight round before and after the round has ended;
   wherein the computing system comprises a tangible, non-transitory computer readable media comprising machine-readable executable code operable on the at least one server.

2. The method of claim 1, wherein the platform is M2CSMP-1 platform, and the wager comprises one or more specific bets, whereby a user makes at least one specific bet comprising a specific amount of money on at least one specific round before the round has begun, at least one specific bet comprising a specific amount of money on the at least one specific round during the round, and/or at least one other bet comprising a specific amount of money on the at least one specific round after the round has ended; wherein the wager is in an open scoring system.

3. The method of claim 1, wherein the round is a combat round selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

4. The method of claim 1, wherein the round is a competition selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

5. The method of claim 3, wherein the combat round presents an opportunity for each character involved in a combat situation divided into individual rounds to take an action against each other that vary in length and number depending on the competition;
wherein the round lasts at least six seconds, during which a round a character can perform a limited number of actions between two individuals or two groups;
wherein the combat round comprises techniques used by the combatants against each other:
a punch comprising jab, cross, hook, uppercut, spinning backfist, elbow punch, forearm punch;
a kick comprising front-kicks, sidekicks, back kicks, hook kicks, roundhouse kicks, wheel kicks, and spinning kicks; or kneeing comprising front kneeing and roundhouse kneeing.

6. The method of claim 1, wherein the PRPRA is a split comprising unlimited variation combat round split percentages for the winner and the loser for every round from 1 round up to 100 rounds, comprising: 100% and 0%, 90% and 10%, 80% and 20%, 70% and 30%, 60% and 40%, or 50% and 50%.

7. The method of claim 1, the M2CSP does not require a computing system, data processor, display system, or server, wherein the display system or device is a jumbotron, jumbovision, messageboard, scoreboard, whiteboard, blackboard or large screen displaying the scores, wherein the wager is performed at the venue, by M2C Subscribers, in person.

8. A system comprising:
at least one computing system;
at least one data processor to provide at least one platform;
at least one display system;
a wager at the at least one server from a first M2C Subscriber using a first user interface device in communication with the at least one server, the wager published at the at least one server;
the at least one server to receive at least one response to the wager by at least one of a plurality of M2C Subscribers; the at least one response published at the at least one server; using an M2C Methodology;
an account of the first M2C Subscriber to credit with a percentage payment based on the predetermined Percentage Round Purse Reward Amount (PRPRA); wherein the percentage payment is based on the integration of the wager on a winner and a loser of any given fight round before and after the round has ended;
wherein the computing system comprises a tangible, non-transitory computer readable media comprising machine-readable executable code operable on the at least one server.

9. The system of claim 8, wherein the at least one platform is M2CSMP-1, and the wager comprises one or more specific bets, whereby a user makes at least one specific bet comprising a specific amount of money on at least one specific round before the round has begun, at least one specific bet comprising a specific amount of money on the at least one specific round during the round, and/or at least one other bet comprising a specific amount of money on the at least one specific round after the round has ended; wherein the wager is in an open scoring system.

10. The system of claim 8, wherein the round is a combat round selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

11. The system of claim 8, wherein the round is a competition selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

12. The system of claim 10, wherein the combat round presents an opportunity for each character involved in a combat situation divided into individual rounds to take an action against each other that vary in length and number depending on the competition; wherein the round lasts at least six seconds, during which a round a character can perform a limited number of actions between two individuals or two groups; wherein the combat round comprises techniques used by the combatants against each other: a punch comprising jab, cross, hook, uppercut, spinning backfist, elbow punch, forearm punch; a kick comprising front-kicks, sidekicks, back kicks, hook kicks, roundhouse kicks, wheel kicks, and spinning kicks; or kneeing comprising front kneeing and roundhouse kneeing.

13. The system of claim 8, wherein the PRPRA is a split comprising unlimited variation combat round split percentages for the winner and the loser for every round from 1 round up to 100 rounds, comprising: 100% and 0%, 90% and 10%, 80% and 20%, 70% and 30%, 60% and 40%, or 50% and 50%.

14. The system of claim 8, wherein the display system or device is a jumbotron, jumbovision, messageboard, scoreboard, whiteboard, blackboard or large screen displaying the scores; with or without a computing system, data processor, display system, and/or server.

15. A wagering system operating on at least one central server enabling betting among M2C Subscriber, the system comprising:
at least one computing system;
at least one data processor;
a platform;
a wager at the at least one central server, a first member using a first user interface device in communication with the at least one central server;
a means for receiving at the at least one central server at least one response to the wager by at least one of a plurality of M2C Subscribers;
a means for publishing the at least one response at the least one central server;
a percentage payment betting methodology app for individual combat fight round purse split amounts between two combat fighters or an M2C Striker vs Puncher Live Video Streaming/PPV/Bets Combat Sports percentage payment betting app methodology option; and
a means for crediting an account of the first member with a percentage payment; wherein the percentage payment is based on M2C Live M2C Subscriber's bet on a winner and a loser of any given fight round before and after the round has ended; wherein the computing system comprises a tangible, non-transitory computer readable media comprising machine-readable executable code operable on the at least one central server.

16. The system of claim 15, wherein the platform is M2CSMP-1 platform, and the wager comprises one or more specific bets, whereby a user makes at least one specific bet comprising a specific amount of money on at least one specific round before the round has begun, at least one specific bet comprising a specific amount of money on the at least one specific round during the round, and/or at least one other bet comprising a specific amount of money on the at least one specific round after the round has ended; wherein the wager is in an open scoring system.

17. The system of claim 15, wherein the round is a combat round selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

18. The system of claim 17, wherein the round is a competition selected from the group consisting of: Mixed Martial Arts, Boxing, Kickboxing, Amateur MMA and Boxing, Judo, Brazillian Jujitsu, Muay Thai, Wrestling, Creco-Roman Wrestling, Karate, Taekwondo, Bare Knuckle Boxing, Amateur Olympic Boxing, Grappling, Kendo, and Sanshou.

19. The system of claim 17, wherein the combat round presents an opportunity for each character involved in a combat situation divided into individual rounds to take an action against each other that vary in length and number depending on the competition;
 wherein the round lasts at least six seconds, during which a round a character can perform a limited number of actions between two individuals or two groups;
 wherein the combat round comprises techniques used by the combatants against each other:
 a punch comprising jab, cross, hook, uppercut, spinning backfist, elbow punch, forearm punch;
 a kick comprising front-kicks, sidekicks, back kicks, hook kicks, roundhouse kicks, wheel kicks, and spinning kicks; or kneeing comprising front kneeing and roundhouse kneeing.

20. The system of claim 15, wherein the PRPRA is a split comprising unlimited variation combat round split percentages for the winner and the loser for every round from 1 round up to 100 rounds, comprising: 100% and 0%, 90% and 10%, 80% and 20%, 70% and 30%, 60% and 40%, or 50% and 50%.

* * * * *